Patented Apr. 19, 1949

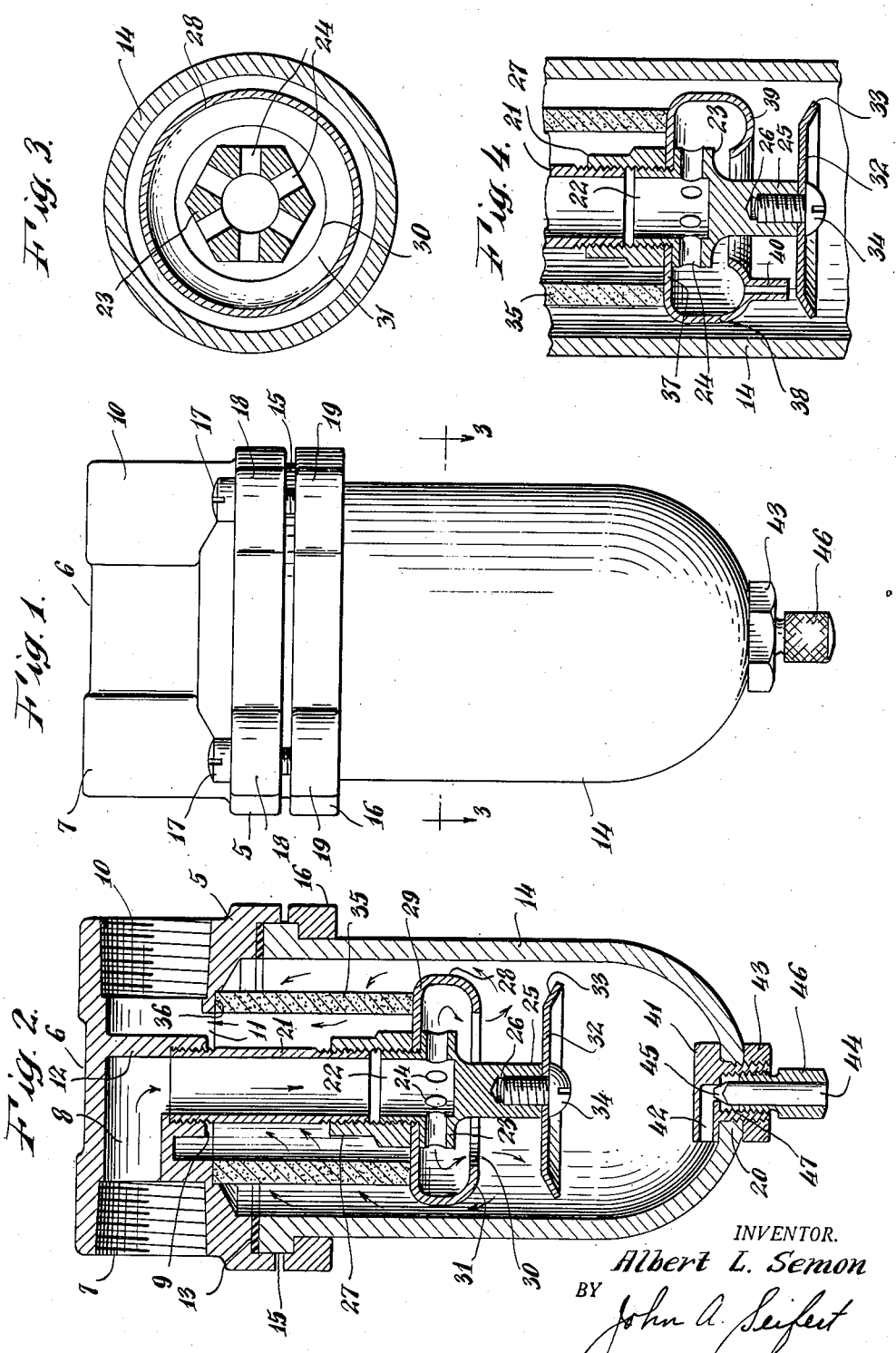
April 19, 1949.  A. L. SEMON  2,467,408
AIR FILTERING AND MOISTURE SEPARATING DEVICE
Filed March 8, 1948
INVENTOR.
Albert L. Semon
BY John A. Seifert
ATTORNEY.

2,467,408

UNITED STATES PATENT OFFICE 2,467,408

AIR FILTERING AND MOISTURE SEPARATING DEVICE

Albert L. Semon, Short Hills, N. J.

Application March 8, 1948, Serial No. 13,615

13 Claims. (Cl. 183—73)

This invention relates to devices mounted in air supply conduits of pneumatically operated tools and the like for filtering the air and separating and removing moisture and other foreign matter therefrom to prevent undue wear and possible destruction of the pneumatically operated tools.

It is an object of the invention to provide a device of this character which is inexpensive to manufacture and readily taken apart for purpose of cleaning or replacing the parts thereof.

It is another object of the invention to provide a device wherein moisture and other foreign matter is separated and removed from the air by a baffle and the moisture freed air directed toward a filtering element by a second baffle which also prevents said air from picking up previously removed moisture and other foreign matter.

It is a further object of the invention to provide a drainage outlet in the bottom of a moisture collecting chamber of the device having an inlet portion extending in a horizontal plane and an outlet portion extending at a right angle to the inlet portion through the wall of the chamber.

Other objects and advantages of the invention will be set forth in the detailed description of the invention.

In the drawing accompanying and forming a part of this application, Figure 1 is an elevational view of the device constituting the embodiment of the invention.

Figure 2 is a longitudinal sectional view of the device.

Figure 3 is a cross sectional view taken on the line 3—3 of Figure 1 looking in the direction of the arrows to show air discharge orifices and the first baffle for separating and removing moisture from the air.

Figure 4 is a fragmentary sectional view showing the structure of a modified baffle for separating and removing moisture from the air.

An air filtering element and moisture separating baffles constituting the embodiment of the invention illustrated in the accompanying drawing are housed in a casing including a head 5 having a boss 6 integral with and extending diametrically of the top thereof. One end 7 of the boss is arranged with internal screw threads for the engagement of a pipe section connected to a source of supply of air pressure, such as an air compressor, not shown. The boss end 7 constitutes an air inlet port of the head and communicates with a passage 8 in the boss leading to an internally screw threaded boss 9 depending from the diametrical center of the bottom of the head. The opposite end 10 of the boss 6 is also internally screw threaded for the engagement of a pipe section connected to a pneumatically operated tool. The boss end 10 constitutes an air outlet port of the head and communicates with an opening 11 in the bottom of the head on one side of the boss 9. The passage 8 is separated from the boss end 10 by a wall 12 merging with a portion of the boss 9, as shown in Figure 2.

The bottom of the head 5 is arranged with an annular seat 13 for the engagement of the edge of an open end of a receptacle 14 having a flange 15 at said open end for the engagement of a ring 16. The ring 16 is releasably connected to the head 5 by screws 17 engaged in ears or projections 18 extended laterally from and equidistantly spaced around the head and screw threaded in ears or projections 19 extended laterally from the ring 16 in corresponding relation to the ears 18. The bottom of the receptacle is curved inwardly to a center horizontal portion 20, as shown in Figure 2. The receptacle 14 may be made of suitable transparent material, such as glass or plastic, whereby the operation of the device is readily observed.

The air entering the inlet 7 is delivered to an intermediate portion of the receptacle 14 through a tube 21 having one end portion mounted in the boss 9 by the screw threads thereof. The opposite end of the tube is externally screw threaded and adapted to discharge the air in a plurality of streams of air radially from the tube toward the side wall of the receptacle at a high velocity. This is accomplished by a nozzle member having a tubular end portion 22 externally screw threaded and of a diameter corresponding to the diameter of the tube 21 and an enlarged intermediate portion 23 arranged with a plurality of orifices 24 extending radially from and in communication with the bore of the tubular end portion 22 extended into the intermediate portion 23. The diameter of each orifice is greatly reduced in comparison with the diameter of the bore of the tube 21, so that the velocity of the air being discharged through the orifices is increased. The opposite end portion of the nozzle member is a solid depending portion 25 having a screw threaded recess 26 extending into the end thereof for a purpose to be described.

The nozzle member 22—26 is mounted on the free end of the tube 21 by a coupling member 27 internally screw threaded for engagement on the free end of the tube 21 and the tubular end portion 22 of the nozzle member, as shown in Figures 2 and 4.

The radial streams of air discharged through the orifices 24 impinge against the side wall 28 of a cup shaped baffle having the closed end or bottom wall 29 arranged with a center opening to engage the baffle on the tubular end portion 22 of the nozzle member. Said baffle is secured to the nozzle member with the side wall 28 spaced from the side wall of the receptacle 14 by clamping the bottom wall 29 against the enlarged nozzle portion 23 by the coupling member 27, as shown in Figures 2 and 4. The impingement of the radial air streams against the baffle side wall 28 at a high velocity will cause the collection of moisture and other foreign matter on said side wall 28 and the separation of the moisture and other foreign matter from the air which flows through the open end 30 of the baffle. To increase the amount of moisture and other foreign matter separated and removed from the air, the free end of the side wall 28 of the baffle is curved inwardly to form an annular collecting basin 31, as shown in Figure 2. The moisture collected in the basin drains through the open end 30 into the curved bottom portion of the receptacle 14.

Moisture freed air leaving the baffle through the open end 30 thereof is directed in an upward direction through the space between the baffle side wall 28 and the side wall of the receptacle 14 and is prevented from picking up moisture in the bottom of the receptacle 14 by a second baffle 32 of plate form having the peripheral portion extended in a downward oblique direction, as at 33, and secured to the depending nozzle portion 25 by a screw 34 engaged in a center opening in the baffle 32 and the screw threaded recess 26 in said depending nozzle portion, as shown in Figures 2 and 4. The peripheral portion 33 facilitates drainage of the collected moisture from the collecting basin 31 to the bottom of the casing receptacle 14.

The moisture freed air flows from the space between the baffle side wall 28 and the side wall of the receptacle 14 through a cylindrical filtering element 35 supported between the head 5 and the cup shaped baffle by engaging the upper end of said filtering element in an annular seat 36 in the bottom of the head encircling the boss 9 and opening 11 and the lower end of the filtering element engaging the baffle bottom wall 29. As the bottom end of the filtering element 35 is closed by the baffle wall 29, the moisture freed and filtered air will flow through the opening 11 to the outlet 10 of the head 5 and the pneumatically operated tool. The filtering element 35 removes all foreign matter not separated and removed from the air by the baffle 28—31. The flow of air through the device is indicated by arrows in Figure 2.

Figure 4 shows a modified form of the cup shaped baffle 28—31 comprising a closed end or bottom wall 37 and a side wall 38 having the free end portion curved to arcuate form to form an annular collecting basin 39 to assure collecting of all moisture separated from the air, and the collected moisture is drained into the bottom of the receptacle 14 through an elongated drain opening 40 in the lowermost portion of the basin 39. The modified form of cup shaped baffle 37—40 is mounted on the nozzle member 22—26 in the same manner as the cup shaped baffle 28—31.

The tube 21, nozzle member 22—26, and baffles 28—31 or 37—40 and 32, 33 are assembled and mounted on the casing head 5 prior to the mounting of the casing receptacle 14 on said head.

The lower portion 20 of the receptacle 14 is provided with a drain opening comprising a cap shaped member 41 having the skirt portion internally and externally screw threaded and engaged in an opening in said receptacle portion 20 with the end of the skirt projecting from the exterior of said receptacle portion and a horizontal passage 42 extending into a side of the head of the cap member and communicating with the interior of the skirt portion. The cap member 41 is secured to the receptacle portion 20 by a nut 43 engaged on the external screw threads of the projecting end of the skirt portion in abutting relation to the exterior of the receptacle portion 20. The collected moisture flows down the curved wall of the bottom of the receptacle 14 and into the passage 42 and interior of the skirt portion of the cap member. The passage 42 is normally closed by a valve in the form of a stem 44 having a beveled end 45 to engage the juncture between the passage 42 and the interior of the skirt portion of the cap member and carried by a knob 46 adjustably engaged with the internal screw threads of the skirt portion of the cap member 41. The knob 46 is adjusted to move the beveled stem end 45 from the passage 42 to permit the flow of moisture to a chamber 47 formed in the skirt portion of the cap member 41 by the knob 46. When it is desired to completely drain the receptacle 14, the knob 46 is removed from the cap member 41.

Having thus described my invention, I claim:

1. In an air filter and moisture separator, a casing having inlet and outlet ports at the top thereof, a tube mounted at one end in communication with the inlet port and the opposite end of the tube terminating in spaced relation to the bottom of the casing and arranged with air discharge orifices extending transversely of the longitudinal axis of the tube to direct the air toward the side wall of the casing, a baffle supported by the tube and having a solid wall portion extending in spaced relation to and transversely of the air discharge orifices of the tube to collect moisture from the air discharged from said discharge orifices and arranged for the drainage of the collected moisture into the bottom of the casing, and a cylindrical filtering element in spaced relation between the side wall of the casing and the tube and the space between the filtering element and the tube having one end closed by the baffle and the opposite end in communication with the outlet port of the casing.

2. In an air filter and moisture separator as claimed in claim 1, a second baffle supported by the tube below the first baffle to extend between said first baffle and the bottom of the casing to direct moisture freed air to the space between the filtering element and the casing and maintain the separation of the air and moisture.

3. In an air filter and moisture separator as claimed in claim 1, a drainage outlet in the bottom of the casing having a horizontally extending inlet portion opening to the casing and an outlet portion extending vertically through the wall of the casing.

4. In an air filter and moisture separator, a casing having inlet and outlet ports at the top thereof arranged to be connected in an air conduit, the inlet port having a vertical extension extending into the casing and arranged with air discharge orifices extending in a plane parallel of the inlet and outlet ports to direct the air toward the side wall of the casing, a baffle supported by the vertical extension and having a solid annular wall portion extending between the air discharge orifices and the side wall of the casing to collect moisture from the discharged air and arranged for drainage of the collected moisture into the bottom of the casing, and a cylindrical filtering element supported by the baffle in spaced relation between the side wall of the casing and the vertical extension with one end of the space between the filtering element and the vertical extension closed by the baffle and the opposite end of said space in communication with the outlet port of the casing.

5. In an air filter and moisture separator, a casing having inlet and outlet ports at the top thereof arranged to be connected in an air conduit, a tube mounted at one end in communication with the inlet port to extend into the casing with the opposite end of the tube spaced from the bottom of the casing and arranged with a series of air discharge orifices extending radially from the vertical axis of the tube to direct the discharged air toward the side wall of the casing, a cup shaped baffle having the closed end supported by the tube with a solid side wall positioned between the air discharge orifices and the side wall of the casing to collect moisture from the discharged air and arranged at the open end for the drainage of the collected moisture into the bottom of the casing, and a cylindrical filtering element clamped between the top of the casing and the closed end of the baffle in spaced relation between the tube and the side wall of the casing with the lower end of the space between the tube and filtering element closed by the closed end of the baffle and the upper end of said space communicating with the outlet port of the casing.

6. In an air filter and moisture separator as claimed in claim 5, a second baffle of plate form supported by the tube in spaced relation to the open end of the cup shaped baffle to extend between said cup shaped baffle and the bottom of the casing with the periphery of the second baffle spaced from the side wall of the casing to guide moisture freed air to the space between the filtering element and the side wall of the casing and maintain the separation of the air and moisture.

7. An air filter and moisture separator as claimed in claim 6, wherein the peripheral portion of the second baffle extends in an oblique direction from the bottom face thereof to facilitate the drainage of the collected moisture from the first baffle into the bottom of the casing.

8. An air filter and moisture separator as claimed in claim 5, wherein the free end portion of the side wall of the cup shaped baffle is curved inwardly toward the open end of the baffle to form an annular moisture collecting basin leading to said open end for drainage of moisture into the bottom of the casing.

9. An air filter and moisture separator as claimed in claim 5, wherein the free end portion of the side wall of the cup shaped baffle is curved inwardly to arcuate shape in cross section to form an annular basin and having an opening in an intermediate portion of said annular basin for the drainage of moisture into the bottom of the casing.

10. In an air filter and moisture separator, a casing having inlet and outlet ports at the top thereof arranged for connection in an air conduit, a tube mounted at one end in communication with the inlet port and extended into the casing with the free end spaced from the bottom of the casing, a nozzle member having air discharge orifices in the side wall thereof and mounted on the free end of the tube with the air discharge orifices extending transversely of the longitudinal axis of the tube and spaced from the side wall of the casing, a cup shaped baffle mounted on the nozzle member with the side wall extending in spaced relation between the air discharge orifices and the side wall of the casing to collect moisture from the discharged air and the open end of the baffle arranged for the drainage of the collected moisture into the bottom of the casing, and a cylindrical filtering element mounted between the top of the casing and the baffle in spaced relation between the tube and the side wall of the casing and the lower end of the space between the tube and filtering element closed by the closed end of the baffle and the upper end of said space communicating with the outlet port of the casing.

11. An air filter and moisture separator as claimed in claim 10, wherein the air discharge orifices are arranged in an enlarged portion of the nozzle member intermediate the ends of said member, and a coupling member internally screw threaded for mounting the nozzle member on the free end of the tube with the closed end of the baffle clamped between the coupling member and the enlarged portion of the nozzle member.

12. An air filter and moisture separator as claimed in claim 10, wherein the nozzle member is provided with an axial projection extending through the open end of the baffle, and a second baffle of plate form mounted on said nozzle projection to extend in opposed spaced relation to the open end of the cup shaped baffle.

13. In an air filter and moisture separator, a head having horizontally alined air inlet and outlet ports arranged for connection in an air conduit, a passage in the head extending from the inlet port to an opening in the center of the bottom of the head and the outlet port in the head communicating with an opening in the bottom of the head at a side of the center opening in said bottom, an open top receptacle mounted on the bottom of the head with the openings in said bottom communicating with the receptacle, a tube mounted at one end in the center opening in the bottom of the head and extended into the receptacle with the free end of the tube spaced from the bottom of the receptacle and arranged with horizontally extending air discharge orifices, a baffle supported by the free end of the tube and arranged with a vertical solid wall extending in spaced relation between the orifices and the side wall of the receptacle to collect moisture from the discharged air and having an outlet for the discharged air and the drainage of the collected moisture into the bottom of the receptacle, and a cylindrical filtering element supported between the bottom of the head and the baffle in spaced relation between the tube and side wall of the receptacle with the bottom end of the space between the tube and filtering element closed by the baffle and the upper end of said space communicating with the opening in the bottom of the head communicating with the outlet port in the head.

ALBERT L. SEMON.

REFERENCES CITED

The following references are of record in the file of this patent:

UNITED STATES PATENTS

| Number | Name | Date |
| --- | --- | --- |
| 1,442,689 | Loss | Jan. 16, 1923 |
| 1,468,906 | Inman | Sept. 25, 1923 |
| 2,170,074 | Hewett | Aug. 22, 1939 |
| 2,418,381 | Wegmann | Apr. 1, 1947 |